US012763109B2

(12) United States Patent
Skeffington et al.

(10) Patent No.: US 12,763,109 B2
(45) Date of Patent: Oct. 13, 2026

(54) AUDIOVISUAL SYNCHRONIZATION FOR PERIPHERAL AUDIO DEVICES

(71) Applicant: Roku, Inc., San Jose, CA (US)

(72) Inventors: Michael Skeffington, San Jose, CA (US); Robert Caston Curtis, Napa, CA (US)

(73) Assignee: Roku, Inc., San Jose, CA (US)

( * ) Notice: Subject to any disclaimer, the term of this patent is extended or adjusted under 35 U.S.C. 154(b) by 99 days.

(21) Appl. No.: 18/431,150

(22) Filed: Feb. 2, 2024

(65) Prior Publication Data

US 2025/0252978 A1 Aug. 7, 2025

(51) Int. Cl.

| | |
|---|---|
| ***G11B 27/10*** | (2006.01) |
| ***H04R 1/02*** | (2006.01) |
| ***H04R 3/12*** | (2006.01) |
| ***H04R 29/00*** | (2006.01) |

(52) U.S. Cl.

CPC ............. *G11B 27/10* (2013.01); *H04R 1/028* (2013.01); *H04R 3/12* (2013.01); *H04R 29/002* (2013.01); *H04R 2499/15* (2013.01)

(58) Field of Classification Search

CPC ........... G11B 27/10; H04R 3/12; H04N 21/00
USPC ......................... 386/201, 203, 207, 200, 230
See application file for complete search history.

(56) References Cited

U.S. PATENT DOCUMENTS

| | | | | |
|---|---|---|---|---|
| 10,614,857 | B2 | 4/2020 | Wasada et al. | |
| 10,958,301 | B2 | 3/2021 | Curtis et al. | |
| 2019/0116395 | A1 | 4/2019 | Kerdranvat et al. | |
| 2019/0387344 | A1* | 12/2019 | Kim | H04R 5/04 |
| 2020/0091958 | A1* | 3/2020 | Curtis | H04S 7/301 |
| 2023/0247353 | A1 | 8/2023 | Ali et al. | |

OTHER PUBLICATIONS

European Search Report dated Mar. 20, 2025, for the corresponding Application No. 25155083.6 in 8 pages.

* cited by examiner

*Primary Examiner* — Daquan Zhao
(74) *Attorney, Agent, or Firm* — Straylight LLP

(57) ABSTRACT

Disclosed herein are system, apparatus, article of manufacture, method and/or computer program product embodiments, and/or combinations and sub-combinations thereof, for synchronizing playback of audiovisual media. An example process includes receiving, via at least one microphone, a first signal that is outputted from at least one external speaker that is coupled to a display device; determining, based on the first signal, a latency associated with the at least one external speaker, wherein the latency corresponds to a difference between a transmission time of the first signal by the display device to the at least one external speaker and an output time of the first signal by the at least one external speaker; and providing the latency to the display device, wherein the display device is configured to adjust at least one of a video playback timing and an audio playback timing of an audiovisual media content item based on the latency.

16 Claims, 8 Drawing Sheets

AUDIOVISUAL SYNCHRONIZATION FOR PERIPHERAL AUDIO DEVICES

BACKGROUND

Field

This disclosure is generally directed to synchronization of audio content with corresponding video content, and more particularly, to using audio signals for determining latency of peripheral audio devices in order to synchronize audiovisual media content.

SUMMARY

Provided herein are system, apparatus, article of manufacture, method and/or computer program product embodiments, and/or combinations and sub-combinations thereof, for synchronizing audiovisual content for playback using a peripheral audio device.

In some aspects, a method is provided for synchronizing audiovisual content. The method can operate in any type of electronic device such as a display device (e.g., monitor, television, etc.), television remote control device, computer, smart phone, tablet, wearable (such as a watch or glasses), appliance, internet of things (IoT) device, etc. The method can operate by transmitting, by an electronic device, a first signal to an external speaker that is coupled to an audio interface associated with the electronic device. In some cases, the method can further include obtaining a latency associated with the external speaker, wherein the latency is based on a reception time of the first signal. In some examples, the method can further include adjusting, by the electronic device and based on the latency, at least one of a video playback timing and an audio playback timing of an audiovisual media content item.

In some aspects, a system is provided for synchronizing audiovisual content. The system can include one or more memories and at least one processor coupled to at least one of the one or more memories and configured to transmit a first signal to an external speaker that is coupled to an audio interface associated with the system. The at least one processor of the system can be configured to obtain a latency associated with the external speaker, wherein the latency is based on a reception time of the first signal. The at least one processor of the system can also be configured to adjust, based on the latency, at least one of a video playback timing and an audio playback timing of an audiovisual media content item.

In some aspects, a non-transitory computer-readable medium is provided for processing image data captured by an image sensor in order to remove occlusions. The non-transitory computer-readable medium can have instructions stored thereon that, when executed by at least one computing device, cause the at least one computing device to transmit a first signal to an external speaker that is coupled to a peripheral audio interface. The instructions of the non-transitory computer-readable medium can, when executed by the at least one computing device, cause the at least one computing device to obtain a latency associated with the external speaker, wherein the latency is based on a reception time of the first signal. The instructions of the non-transitory computer-readable medium also can, when executed by the at least one computing device, cause the at least one computing device to adjust, based on the latency, at least one of a video playback timing and an audio playback timing of an audiovisual media content item.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
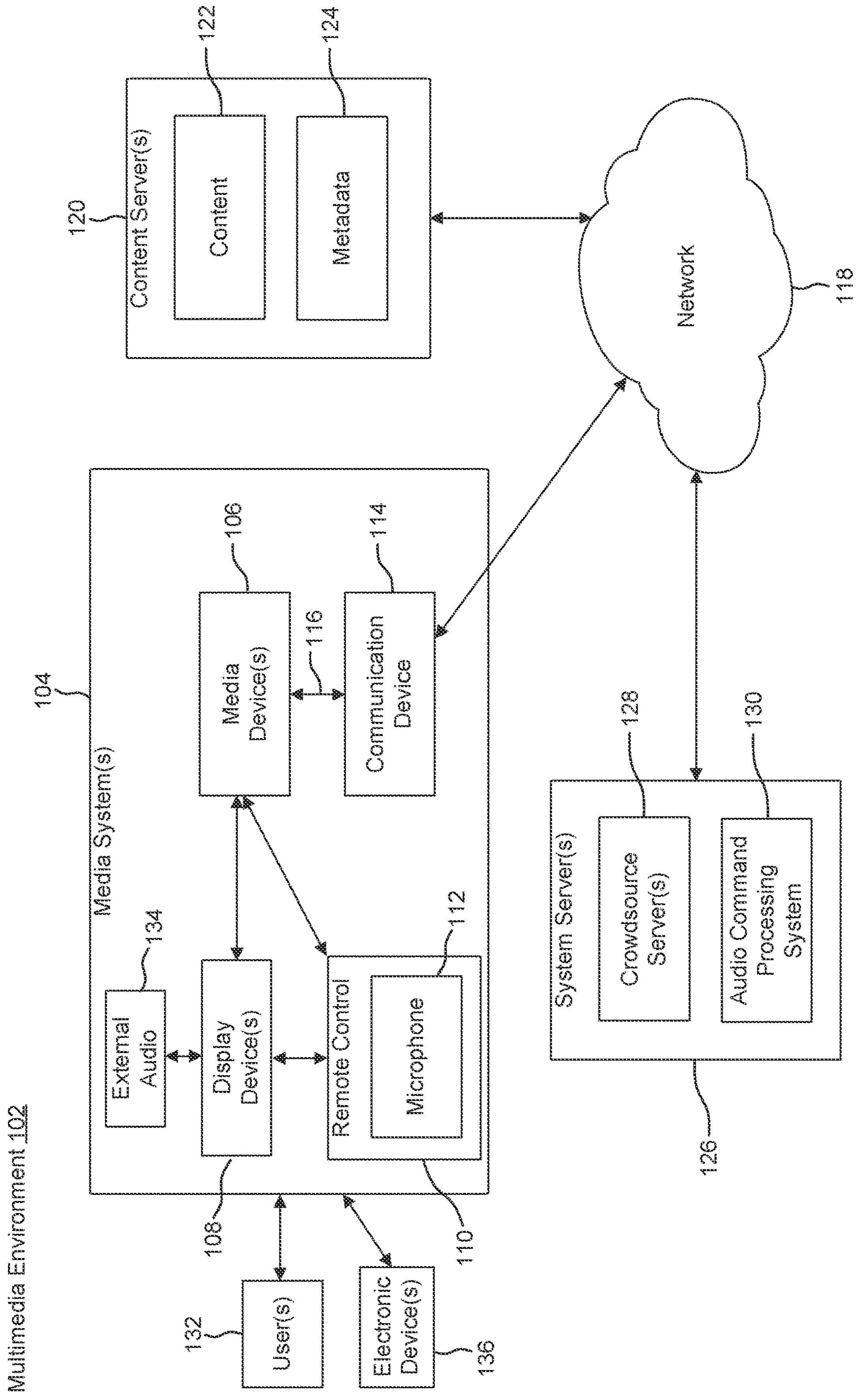
FIG. 1 illustrates a block diagram of a multimedia environment, according to some aspects of the present disclosure.

Users can generally access and consume audiovisual media content (e.g., videos) using client devices such as, for example and without limitation, smart phones, set-top boxes, desktop computers, laptop computers, tablet computers, televisions (TVs), IPTV receivers, media devices, monitors, projectors, smart wearable devices (e.g., smart watches, smart glasses, head-mounted displays (HMDs), etc.), appliances, and Internet-of-Things (IoT) devices, among others. The videos can include, for example, live video content broadcast by a content server(s) to the client devices, prerecorded video content available to the client devices on-demand, streaming video content, etc.

Often times the client devices that are used to playback the audiovisual media content may include built-in or integrated speakers. Additionally, the client devices may have the capability to interface with external or peripheral audio devices such as an audio video receiver (AVR), sound bar, etc. In some cases, peripheral audio devices may introduce a delay in the playback of the audio (e.g., due to processing). However, because the video portion of the audiovisual media is played on the user device, the timing between the video portion and the audio portion may become unsynchronized due to the delay.

While some peripheral audio devices attempt to address this issue by providing settings or a user interface (e.g., slider) for adjusting audio playback timing, such solutions are often inadequate because they lack the granularity required to properly synchronize the audiovisual media. Moreover, making adjustments to audio settings requires the user to take action, which can be cumbersome (e.g., delay in using equipment, reading manual for instructions, etc.). Furthermore, adjustments made to audio settings may not be suitable for all media types because different media formats can be associated with different processing delays and changes made to other audio settings (e.g., dialogue enhancement) can also affect the timing. Consequently, a user may be required to constantly deal with synchronization issues.

Provided herein are system, apparatus, device, method and/or computer program product embodiments, and/or combinations and sub-combinations thereof, for synchronizing audiovisual content for playback with a peripheral audio device. In some aspects, a display device can be configured to transmit a signal (e.g., audio signal, tone, spread spectrum signal) via a peripheral audio device. In some cases, the signal can be received (e.g., via a microphone) by the display device and/or another electronic device (e.g., remote control, mobile device, tablet, etc.). In some aspects, the reception time of the signal can be compared to the transmission time and/or the expected playback time (based on the synchronized internal timing of the display device) of the signal in order to determine a delay or latency associated with playback of the signal via the peripheral audio device.

In some aspects, the display device can be configured to transmit multiple signals. For instance, the signal that is transmitted to the peripheral audio device can be simultaneously played using an integrated (e.g., internal) speaker. The playback timing from the internal speaker is expected to be synchronized because it is based on the internally synchronized timing of the display device. Therefore, the microphone can be used to determine the reception time of the signal played using the internal speaker as well as the signal played using the peripheral audio device. The difference in the reception times can be the latency introduced by the peripheral audio device. The latency can then be used to adjust playback of the audiovisual media item. In one illustrative example, the video signal that is presented on the display of the display device can be delayed so that it is aligned or synchronized to the audio signal that is played via the peripheral audio device.

In some aspects, the synchronization procedure can be performed automatically by the display device without user intervention. In some cases, the signals that are transmitted via the integrated speaker and/or the peripheral audio device can be subaudible such that the user is unaware that the synchronization procedure is taking place. Further, the synchronization procedure can be repeated periodically to ensure that synchronization is maintained in the case of changes in audio settings and/or in types of media.

Various embodiments, examples, and aspects of this disclosure may be implemented using and/or may be part of a multimedia environment 102 shown in FIG. 1. It is noted, however, that multimedia environment 102 is provided solely for illustrative purposes and is not limiting. Examples and embodiments of this disclosure may be implemented using, and/or may be part of, environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, wireless, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some examples, media device 106 can be a part of, integrated with, operatively coupled to, and/or connected to its respective display device 108.

In some cases, display device 108 may be coupled to one or more peripheral or external audio devices such as external audio 134. In some examples, external audio 134 can include a soundbar, an audio/video receiver (AVR), one or more speakers, a surround sound system, and/or any other electronic device that may be configured to receive and playback audio signals. As understood by those having ordinary skill in the art, display device 108 can be coupled to external audio 134 using any type of suitable interface (e.g., wireless interface, wired interface, etc.).

Each media device 106 may be configured to communicate with network 118 via a communication device 114. The communication device 114 may include, for example, a cable modem or satellite TV transceiver. The media devices 106 may communicate with the communication device 114 over a link 116, wherein the link 116 may include wireless (such as WiFi) and/or wired connections. Alternatively, or in addition, media devices 106 may include one or more transceivers that can be configured to communicate directly with network 118 and/or with other media devices 106.

In various examples, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In some examples, the remote control 110 wirelessly communicates with the media device 106 and/or display device 108 using cellular, Bluetooth, infrared, etc., or any combination thereof. The remote control 110 may include a microphone 112, which is further described below.

Multimedia environment 102 may include one or more other electronic device(s) 136 that can be coupled to media system 104. Examples of electronic device(s) 136 can include mobile phones (e.g., "smart" phones), IoT devices, tablets, wearable devices, extended reality devices (e.g., a virtual reality (VR) device, an augmented reality (AR) device, or a mixed reality (MR) device), a personal computer, a laptop computer, a television, etc. In some aspects, electronic device(s) 136 can be configured to communicate with one or more components of media system 104. For instance, electronic device(s) 136 may communicate with display devices 108, media devices 106, remote control 110, communication device 114, and/or external audio 134.

The multimedia environment 102 may include a plurality of content servers 120 (also called content providers, channels or sources). Although only one content server 120 is shown in FIG. 1, in practice, the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, targeted media content, software, recording or live feed from a surveillance and security system, and/or any other content or data objects in electronic form.

In some examples, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining to or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming of the movie.

The system servers 126 may also include an audio command processing system 130. As noted above, the remote control 110 may include a microphone 112. The microphone 112 may receive audio data from users 132 (as well as other sources, such as the display device 108 and/or the external audio 134). In some examples, the media device 106 may be audio responsive, and the audio data may represent verbal commands from the user 132 to control the media device 106 as well as other components in the media system 104, such as the display device 108.

In some examples, the audio data received by the microphone 112 in the remote control 110 is transferred to the media device 106, which is then forwarded to the audio command processing system 130 in the system servers 126. The audio command processing system 130 may operate to process and analyze the received audio data to recognize the user 132's verbal command. The audio command processing system 130 may then forward the verbal command back to the media device 106 for processing.

Figure 2:
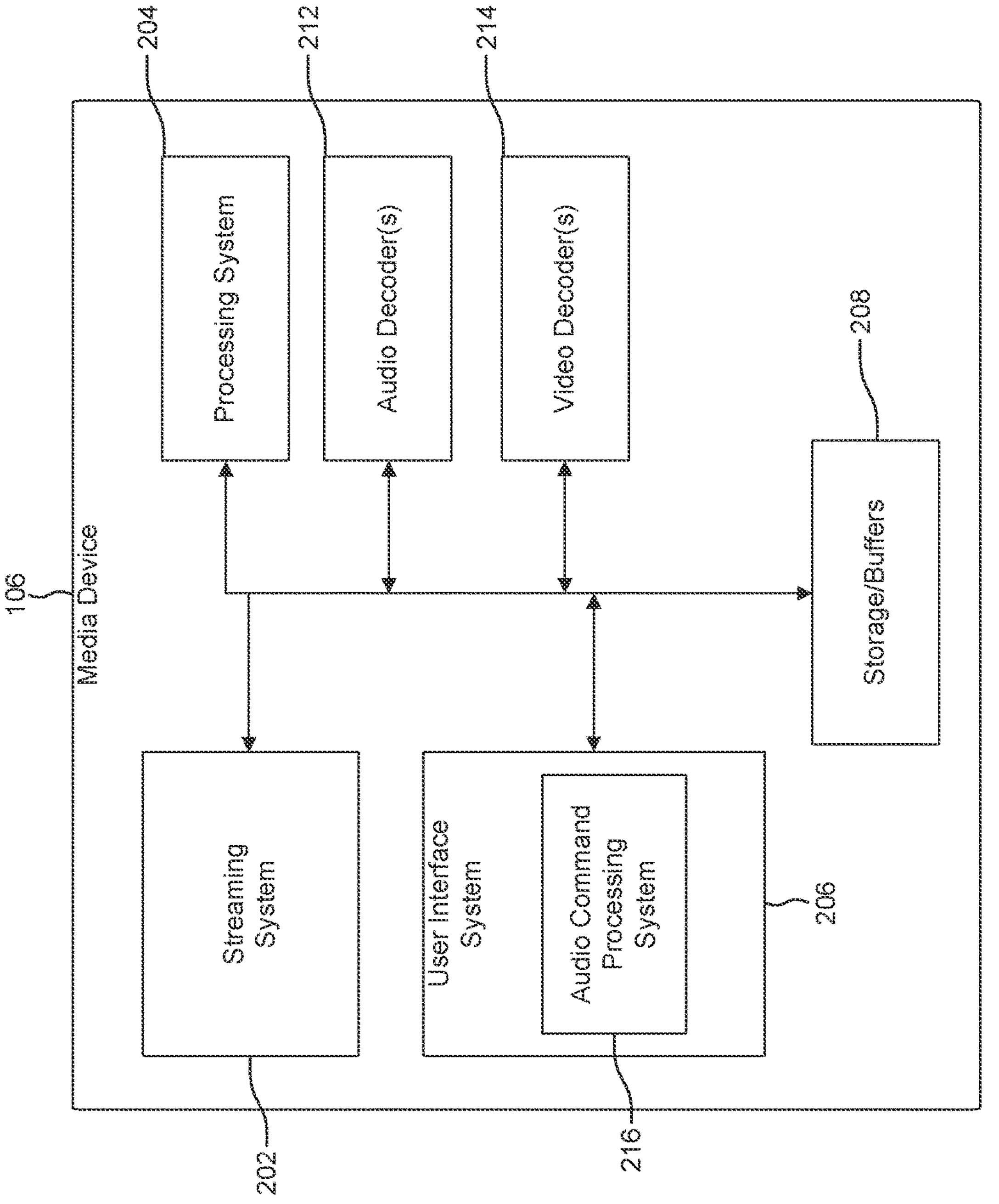
FIG. 2 illustrates a block diagram of a streaming media device, according to some aspects of the present disclosure.

In some examples, the audio data may be alternatively or additionally processed and analyzed by an audio command processing system 216 in the media device 106 (see FIG. 2). The media device 106 and the system servers 126 may then cooperate to pick one of the verbal commands to process (either the verbal command recognized by the audio command processing system 130 in the system servers 126, or the verbal command recognized by the audio command processing system 216 in the media device 106).

In some cases, remote control 110 can share one or more synchronization signals with display device 108 and/or media device 106. For instance, aspects of remote control 110 may operate using a clock signal that is also used by display device 108 and/or media device 106 such that remote control 110 can be synchronized with display device 108 and/or media device 106.

In some examples, display device 108, remote control 110 and/or electronic devices 136 can be configured to determine an audio latency associated with external audio 134. For example, display device 108, remote control 110, and/or electronic device(s) 136 can include a microphone that is configured to receive audio signals that are outputted by external audio 134. In some cases, display device 108, remote control 110, and/or electronic device(s) 136 can determine a difference between the time the audio signal was received and a time at which the audio signal was expected to be played (e.g., based on data from display device 108 and/or based on a synchronization signal). In some aspects, this time difference can correspond to a latency associated with external audio 134.

In further examples, display device 108, remote control 110, and/or electronic device(s) 136 can be configured to receive multiple audio signals that are outputted by display device 108 and external audio 134. For instance, display device 108 can output an audio signal using an integrated (e.g., built-in speaker) and simultaneously transmit an audio signal to external audio 134. In some aspects, display device 108, remote control 110, and/or electronic device(s) 136 can receive the respective audio signals (e.g., from display device 108 and external audio 134) and determine a difference in the reception time of the respective audio signals. The difference in reception time can correspond to the latency of external audio 134, which can then be used to adjust playback timing of audio and/or video signals associated with an audiovisual content item in order to synchronize the video playback on display device 108 with the audio playback from external audio 134. Further details regarding the present technology are discussed herein with respect to FIGS. 3A, 3B, 4, 5, and 6.

FIG. 2 illustrates a block diagram of an example media device 106, according to some examples. As noted above, in some examples, media device 106 can be a part of, integrated with, operatively coupled to, and/or connected to its respective display device 108. In some aspects, media device 106 may include a streaming system 202, processing system 204, storage/buffers 208, and user interface module 206. As described above, the user interface module 206 may include the audio command processing system 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. The media device 106 can implement other applicable decoders, such as a closed caption decoder.

Similarly, each video decoder 214 may be configured to decode video of one or more video formats, such as but not limited to MP4 (mp4, m4a, m4v, f4v, f4a, m4b, m4r, f4b, mov), 3 GP (3 gp, 3 gp2, 3 g2, 3 gpp, 3 gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to, H.263, H.264, H.265, VVC (also referred to as H.266), AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some examples, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming system 202 of the media device 106 may request the selected content from the content server(s) 120 over the network 118. The content server(s) 120 may transmit the requested content to the streaming system 202. The media device 106 may transmit the received content to the display device 108 for playback to the user 132.

In streaming examples, the streaming system 202 may transmit the content to the display device 108 in real time or near real time as it receives such content from the content server(s) 120. In non-streaming examples, the media device 106 may store the content received from content server(s) 120 in storage/buffers 208 for later playback on display device 108.

The disclosure now continues with a further discussion of audiovisual synchronization for peripheral audio.

Figure 3A:
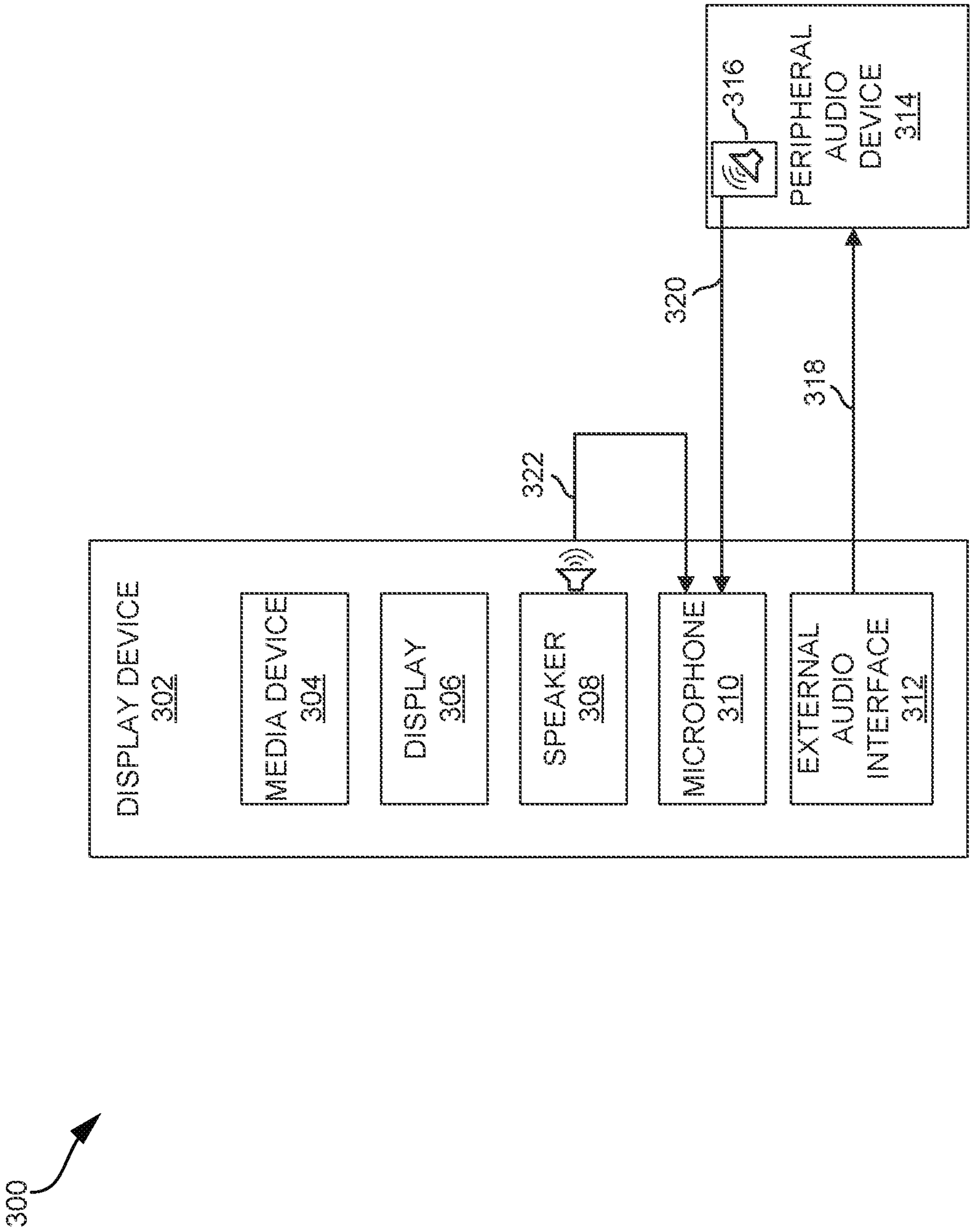
FIG. 3A illustrates an example system that can be configured to synchronize audiovisual content for playback with peripheral audio, according to some aspects of the present disclosure.

FIG. 3A illustrates an example system 300 that can be configured to synchronize audiovisual content for playback with a peripheral audio device. According to some examples, system 300 can include a display device 302. In some aspects, display device 302 may correspond to display device 108 as described in connection with FIG. 1. That is, display device 302 may include a monitor, television (TV), computer, smart phone, tablet, wearable (such as a watch or glasses), appliance, internet of things (IoT) device, projector, etc.

In some aspects, display device 302 may include a media device 304. In some configurations, media device 304 may correspond to media device 106 described in connection with FIG. 1 and FIG. 2. That is, media device 304 may include a streaming media device, DVD or BLU-RAY device, audio/video playback device, digital video recording device, etc. In some instances, media device 304 can be configured to process (e.g., receive, transmit, encode, decode, playback, etc.) media content such as video content, audio content, and/or image content. For example, display device 302 may include a display 306 (e.g., LCD, OLED, plasma display, etc.) that can be used by media device 304 for presentation of video/image content. In another example, display device 302 may include a speaker 308 that can be used by media device 304 to play audio content.

In some configurations, display device 302 may include an external audio interface 312 that can be used to couple (e.g., connect, associate, etc.) display device 302 to a peripheral audio device 314. In some aspects, peripheral audio device 314 can include external speaker(s), a sound bar, an audio video receiver (AVR), a surround sound system, and/or any type of device that may be suitable for playing audio content.

In some cases, display device 302 can be configured to play an audiovisual media content item (e.g., a media content item that includes video/image content and audio content such as a movie, television program, television commercial, sporting event, concert, etc.). In some aspects, the video or image content can be presented using display 306 and the audio content can be played via speaker 308 (e.g., an internal or integrated speaker of display device 302). In some cases, the video or image content can be presented using display 306 and the audio content can be played via speaker 316 that is associated with peripheral audio device 314.

In some aspects, display device 302 may be configured (e.g., tuned, programmed, calibrated, etc.) such that video/image content presented via display 306 is synchronized with the corresponding audio content played using an integrated speaker such as speaker 308. However, in some cases, the video/image content that is presented using display 306 may not be synchronized with the audio content that is played using speaker 316 of peripheral audio device 314. For example, peripheral audio device 314 may introduce a processing delay (e.g., latency) that could result in the audio content played by speaker 316 to lag behind the corresponding image/video content played by display 306. In another example, display device 302 may delay in processing video/image content which may cause the video/image content played on display 306 to lag behind the corresponding audio content played by speaker 316 of peripheral audio device 314.

In some cases, display device 302 can be configured to determine (e.g., calculate) a latency or timing difference between the presentation of image/video content on display 306 and audio content via peripheral audio device 314. Furthermore, in some instances, display device 302 can use the latency or timing difference to synchronize presentation of video/image content that is presented via display 306 with corresponding audio content that is played via peripheral audio device 314.

For example, in some cases, display device 302 can send (e.g., transmit) an audio signal 318 to peripheral audio device 314. As discussed further herein, audio signal 318 can include any type of signal (e.g., spread spectrum signal, narrowband signal, one or more audible tones, one or more subaudible tones, etc.). Audio signal 318 may also include data that directs peripheral audio device 314 to play audio signal 320 using one or more channels (e.g., play using center channel). In turn, peripheral audio device 314 can receive/process audio signal 318 and play audio signal 320 (e.g., via speaker 316). In some aspects, display device 302 can use microphone 310 to receive audio signal 320. In some cases, display device 302 can process (e.g., record, store, decode, analyze, despread, etc.) audio signal 320 in order to determine a reception time of audio signal 320.

In some examples, display device 302 can determine a latency for peripheral audio device 314 based on a time difference between the time that audio signal 318 was transmitted to peripheral audio device 314 and a reception time of audio signal 320 (e.g., a time the audio signal 320 was received by microphone 310). In another example, display device 302 can determine the latency based on a time difference between an expected playback time (e.g., the time that audio signal 318 would have been played using speaker 308) and the reception time of audio signal 320. That is, in some cases, the time that audio signal 318 was transmitted to peripheral audio device 314 may be different than an expected playback time (e.g., based on internal synchronization parameters for display device 302) and display device 302 can determine lag based on expected playback time.

In some aspects, the time difference can be used to adjust playback of video/image content via display 306 and/or audio content via external audio interface 312. For example, video content presented via display 306 can be delayed such that it is synchronized with the output of speaker 316 from peripheral audio device 314. In another example, audio content transmitted via external audio interface 312 can be delayed such that the output audio of speaker 316 (from peripheral audio device 314) is synchronized with video/image content presented via display 306.

In some cases, display device 302 may determine the latency associated with peripheral audio device 314 by transmitting multiple audio signals using different interfaces. For instance, display device 302 can transmit audio signal 322 using integrated speaker 308 and display device 302 can transmit audio signal 318 using external audio interface 312 for playback via peripheral audio device 314. In some cases, audio signal 322 and audio signal 318 can be transmitted simultaneously. In some examples, audio signal 322 and audio signal 318 may correspond to the same audio signal that is transmitted or played using different interfaces.

In some examples, display device 302 may receive audio signal 322 via microphone 310. In some aspects, display device 302 may also receive audio signal 320, which corresponds to the transmitted audio signal 318, via microphone 310. In some configurations, display device 302 may process audio signal 322 and audio signal 320 to determine a reception time for each signal. In some aspects, display device 302 can determine a latency for peripheral audio device 314 based on a time difference between a reception time of audio signal 322 and a reception time of audio signal 320. That is, the latency introduced by peripheral audio device 314 can be determined based on the delay in receiving audio signal 320 as compared to the time audio signal 322 is received by microphone 310. In some aspects, display device can synchronize video/image data with audio output from peripheral audio device 314 by configuring a delay (e.g., based on latency measurement) in presentation of video content that is presented on display 306.

In some cases, peripheral audio device 314 may process audio signal 318 faster than internal circuitry of display device 302, and audio signal 320 may be received by microphone 310 before audio signal 322. That is, in some instances, the audio output of peripheral audio device 314 may precede corresponding video content when peripheral audio device 314 processes audio faster than the internal processing delay associated with display device 302. In such examples, display device may synchronize the audio and video content by using the time difference to delay audio that is transmitted via external audio interface 312.

In some examples, the audio signals (e.g., audio signal 318, audio signal 320, and/or audio signal 322) may correspond to spread spectrum signals. In some aspects, spread spectrum communication can involve spreading a transmitted signal across all or a portion of the frequency spectrum available for transmission. This can result in a transmitted signal with a wider bandwidth. In other words, the transmitted signal can have a bandwidth considerably larger than the frequency content of the original information. In some aspects, spread spectrum communication can be hidden below the noise level. For example, spread spectrum techniques can be used to transmit audio signals (e.g., audio signal 318, audio signal 320, and/or audio signal 322) below the human auditory frequency range. As a result, users will not hear the transmission but devices that know what they are looking for can pull out the underlying data from the spread spectrum signal. In some aspects, one or more of the audio signals (e.g., audio signal 318, audio signal 320, and/or audio signal 322) may include a subaudible spread spectrum signal that is transmitted with a narrowband signal that is within the audible range.

In some cases, display device 302 can generate a spread spectrum signal by applying a spreading code to a base signal. For example, a spreading code can be applied to a base signal modulated using Binary Phase Shift Keying (BPSK). As would be appreciated by a person of ordinary skill in the art, a spreading code can be applied to a base signal modulated using various other techniques. In some aspects, a spreading code can be a pseudorandom sequence of bits that can be unique to a device.

In some aspects, injection of the spreading code can be referred to as a spreading operation that is used to diffuse information in a larger bandwidth. Conversely, the spreading code can be removed or extracted from the spread spectrum signal at a receiving device to recover the original information. This is often called the despreading operation. The dispreading operation can also be referred to as correlation. The despreading operation can recover the original information and can be used to remove noise from the spread spectrum signal. In order to recover the original information, the transmitting device and the receiving device can share the same spreading code. When the same spreading code is used at the transmitting device and the receiving device, the spreading code can be said to have a correlation of one. In the example of FIG. 3A, display device 302 can perform the spreading operation and the despreading operation because the signal is transmitted and received by display device 302.

Figure 3B:
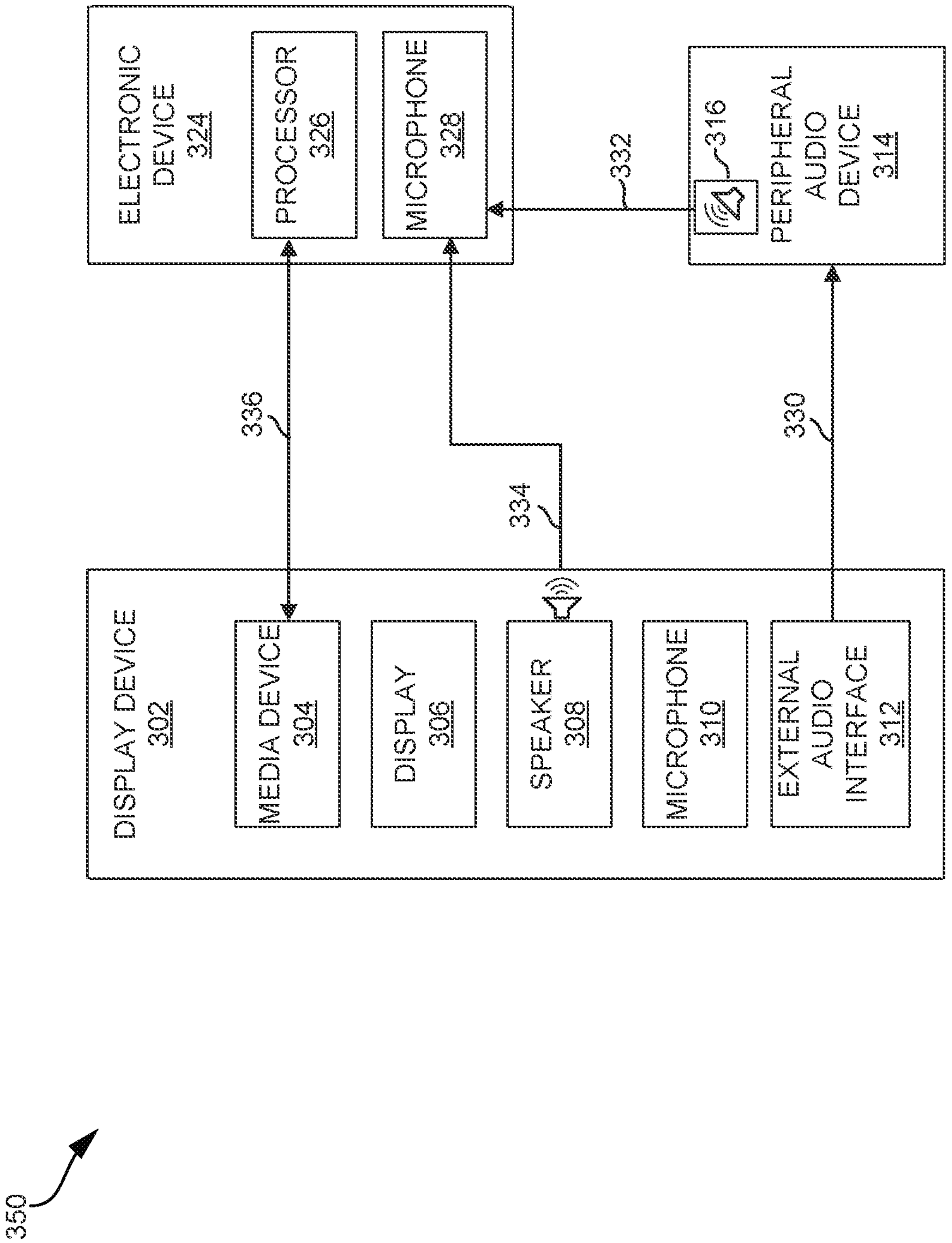
FIG. 3B illustrates another example system that can be configured to synchronize audiovisual content for playback with peripheral audio, according to some aspects of the present disclosure.

FIG. 3B illustrates an example system 350 that can be configured to synchronize audiovisual content for playback with a peripheral audio device. As noted with respect to system 300 in FIG. 3A, system 350 can include display device 302 that can be configured to play an audiovisual media content item wherein the video or image content can be presented using display 306 and the audio content can be played via speaker 316 that is associated with peripheral audio device 314.

In some aspects, system 350 can include one or more additional electronic devices such as electronic device 324. In some examples, electronic device 324 can correspond to a remote control that is associated with display device 302 (e.g., remote control 110). In further examples, electronic device 324 can correspond to a mobile phone, a tablet, a laptop computer, an IoT device, and/or any other type of electronic device (e.g., electronic device 324 can correspond to electronic device(s) 136 as illustrated in FIG. 1).

In some aspects, electronic device 324 may communicate with display device 302 (e.g., via interface 336). In some cases, interface 336 may include a wired interface and/or a wireless interface. In some instances, interface 336 may also include signals that can be used to synchronize communications between display device 302 and electronic device 324. For instance, interface 336 can include a common clock signal that can provide timing information related to playback of media content on display device 302.

In some cases, display device 302 and electronic device 324 can be configured to determine (e.g., calculate) a latency or timing difference between the presentation of image/video content on display 306 and audio content via peripheral audio device 314. For example, in some cases, display device 302 can send (e.g., transmit) an audio signal 330 to peripheral audio device 314. In turn, peripheral audio device 314 can receive/process audio signal 330 and play/output audio signal 332 (e.g., via speaker 316). In some aspects, electronic device 324 can use microphone 328 to receive audio signal 332. In some cases, electronic device 324 can process (e.g., record, store, decode, analyze, despread, etc.) audio signal 332 in order to determine a reception time of audio signal 332 (e.g., processor 326 can process or despread audio signal 332 to determine reception time).

In some examples, electronic device 324 can send the reception time associated with audio signal 332 to display device 302 (e.g., via interface 336). Display device 302 can then use the reception time corresponding to audio signal 332 to determine the latency for peripheral audio device 314. That is, display device 302 can determine a time difference between the time that audio signal 330 was transmitted to peripheral audio device 314 and the time that audio signal 332 was received by electronic device 324.

In some cases, electronic device 324 can determine the latency associated with peripheral audio device 314. For example, electronic device 324 can use data from display device 302 (e.g., via interface 336) to determine the time that audio signal 330 was transmitted and/or the time when audio signal 330 was scheduled for playback. Electronic device 324 can then use the reception time of audio signal 332 to determine the time difference or latency. In some cases, electronic device 324 can send the latency measurement to display device 302. In some configurations, display device 302 can use the latency measurement to adjust playback of an audiovisual media content item to provide synchronization between the video/image component presented on display 306 and the audio component played via peripheral audio device 314.

In some aspects, display device 302 and/or electronic device 324 may determine the latency associated with peripheral audio device 314 based on the timing associated with multiple audio signals. For instance, display device 302 can transmit audio signal 334 using integrated speaker 308 and display device 302 can transmit audio signal 330 using external audio interface 312 for playback via peripheral audio device 314. In some cases, audio signal 334 and audio signal 330 can be transmitted simultaneously. In some examples, audio signal 334 and audio signal 330 may correspond to the same audio signal (e.g., the same signal is played on speaker 308 and transmitted via external audio interface 312).

In some examples, electronic device 324 may receive audio signal 334 via microphone 328. In some aspects, electronic device 324 may also receive audio signal 332, which corresponds to the transmitted audio signal 330, via microphone 328. In some configurations, electronic device 324 may process audio signal 334 and audio signal 332 to determine a reception time for each signal. In some aspects, electronic device 324 can determine a difference in the reception times, which may be due to a latency introduced by peripheral audio device 314 in processing audio signal 330 or by a latency introduced by internal circuitry of display device 302 in processing audio signal 334. In some cases, electronic device 324 can send the latency measurement to display device 302. Alternatively, or in addition, electronic device 324 may send the reception times associated with audio signal 334 and audio signal 332 to display device 302 and display device 302 may determine the timing difference or latency.

As noted above with respect to system 300 in FIG. 3A, the audio signals in system 350 (e.g., audio signal 330, audio signal 332, and audio signal 334) can include or correspond to a spread spectrum signal. In some aspects, display device 302 can perform the spreading operation and electronic device 324 can perform the despreading operation. In some cases, display device 302 can send the spreading code to electronic device 324 via interface 336.

With respect to FIG. 3A and FIG. 3B, system 300 and system 350, respectively, can be used to synchronize audiovisual content for playback with a peripheral audio device 314 periodically. For example, display device 302 can configure a timer that causes system 300 and/or system 350 to implement steps or processes described herein for synchronizing audiovisual content.

In some examples, display device 302 may initiate the process to synchronize audiovisual content based on one or more triggers. For example, the synchronization process can be performed each time the display device 302 is restarted. In another example, the synchronization process can be performed upon detection of a change in one or more audio settings. For instance, a user configuration change such as enabling or disabling a dialogue enhance feature can trigger the synchronization process.

In some cases, data associated with the synchronization process can be stored and collected by display device 302. In some aspects, data associated with the synchronization process can be sent to a remote server such as system server(s) 126. In some examples, the data that is collected and stored can include make/model of display device 302, make/model of peripheral audio device 314, make/model of electronic device 324, metadata associated with audiovisual media content item(s), latency measurements, etc. In some instances, system server(s) 126 can use the synchronization data to configure (e.g., modify, adjust, calibrate, etc.) audiovisual playback settings of one or more display devices (e.g., display devices 108).

Figure 4:
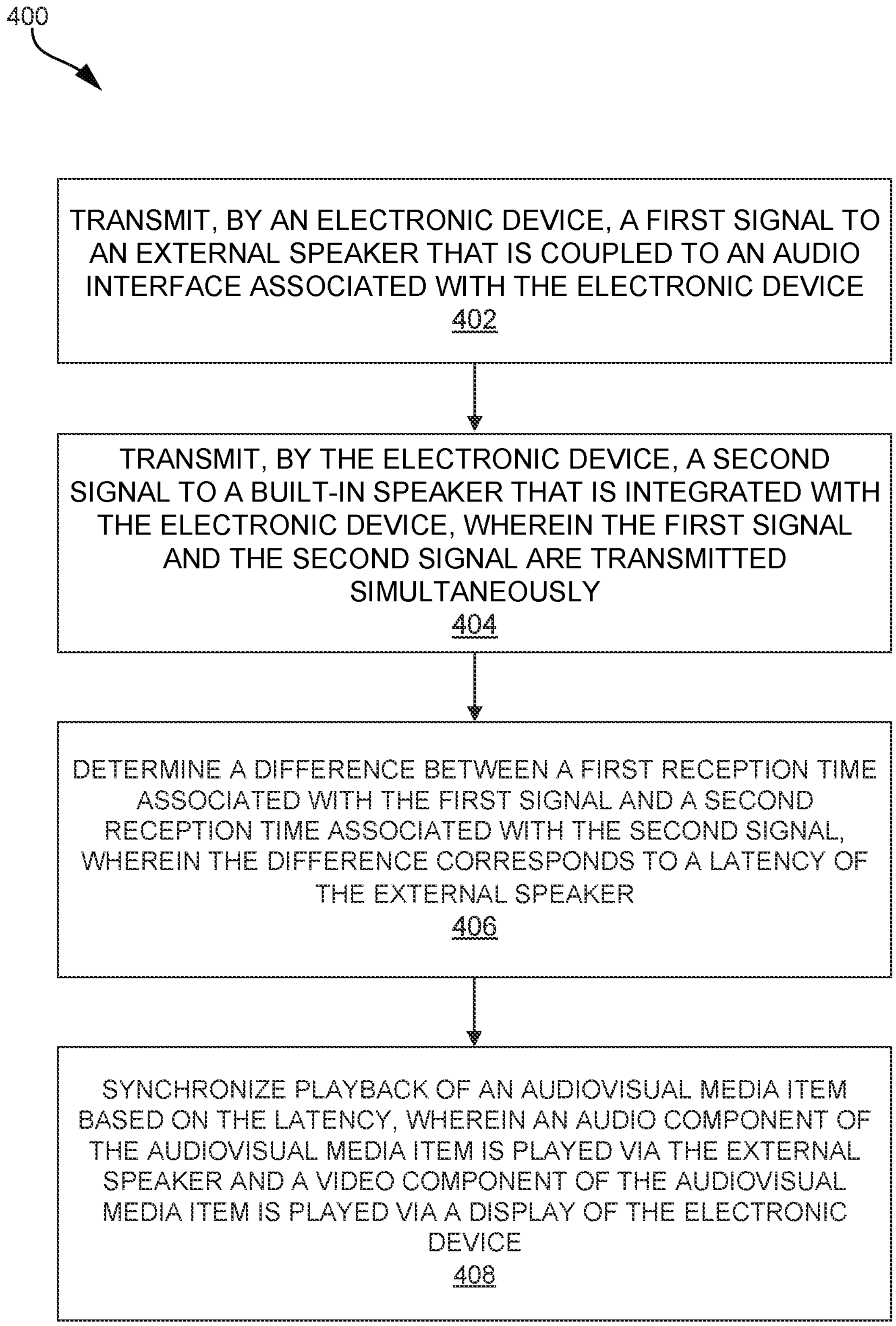
FIG. 4 is a diagram illustrating a flowchart of an example method for synchronizing audiovisual content for playback with peripheral audio, according to some aspects of the present disclosure.

FIG. 4 is a flowchart for a method 400 for synchronizing audiovisual content for playback with a peripheral audio device. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIG. 3A. However, method 400 is not limited to that example.

In step 402, the method 400 includes transmitting, by an electronic device, a first signal to an external speaker that is coupled to an audio interface associated with the electronic device. For example, display device 302 can transmit audio signal 318 to peripheral audio device 314 that is coupled to external audio interface 312.

In step 404, the method 400 includes transmitting, by the electronic device, a second signal to a built-in speaker that is integrated with the electronic device, wherein the first signal and the second signal are transmitted simultaneously. For instance, display device 302 can transmit audio signal 322 to speaker 308 that is integrated with display device 302. In some aspects, audio signal 318 and audio signal 322 can be transmitted simultaneously.

In step 406, the method 400 includes determining a difference between a first reception time associated with the first signal and a second reception time associated with the second signal, wherein the difference corresponds to a latency of the external speaker. For example, display device 302 can determine a difference between a reception time associated with audio signal 320, which corresponds to audio signal 318, and audio signal 322, and the difference can correspond to a latency of peripheral audio device 314.

In step 408, the method 400 includes synchronizing playback of an audiovisual media item based on the latency, wherein an audio component of the audiovisual media item is played via the external speaker and a video component of the audiovisual media item is played via a display of the electronic device. For example, display device 302 can synchronize playback of an audiovisual media item based on the latency, wherein an audio component of the audiovisual media item is played via peripheral audio device 314 and a video component of the audiovisual media item is played via display 306 of display device 302.

Figure 5:
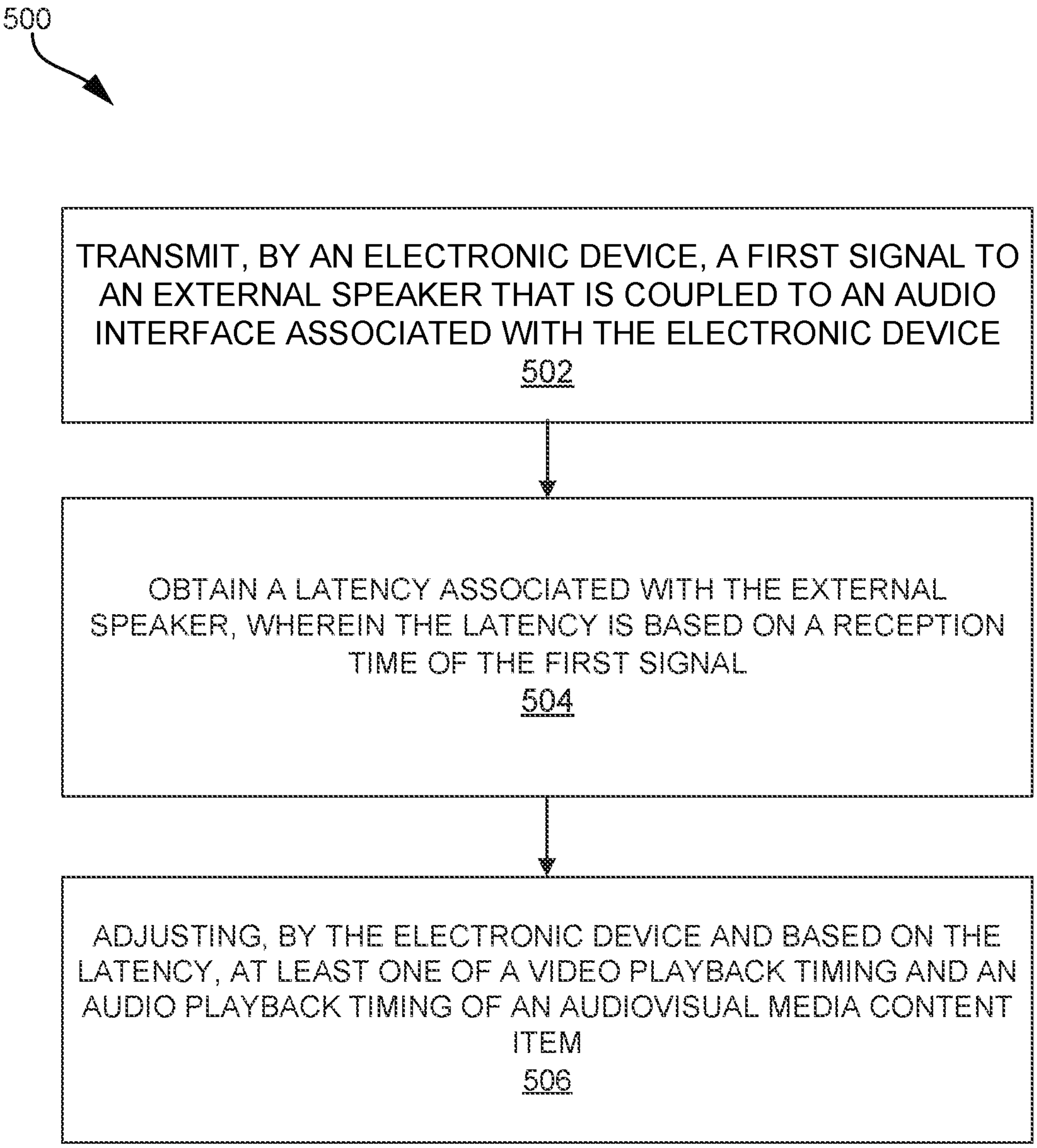
FIG. 5 is a diagram illustrating a flowchart of another example method for synchronizing audiovisual content for playback with peripheral audio, according to some aspects of the present disclosure.

FIG. 5 is a flowchart for a method 500 for synchronizing audiovisual content for playback with a peripheral audio device. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIG. 3A and FIG. 3B. However, method 500 is not limited to those examples.

In step 502, the method 500 includes transmitting, by an electronic device, a first signal to an external speaker that is coupled to an audio interface associated with the electronic device. For example, display device 302 can transmit audio signal 318 and/or audio signal 330 to peripheral audio device 314 that is coupled to external audio interface 312 associated with display device 302. In some examples, the first signal can correspond to a spread spectrum signal.

In step 504, the method 500 includes obtaining a latency associated with the external speaker, wherein the latency is based on a reception time of the first signal. For example, display device 302 can obtain (e.g., determine or calculate) a latency based on a reception time of audio signal 320. That is, display device 302 can determine a difference between the reception time of audio signal 320 and the transmission time of audio signal 318 or the expected playback time (e.g., based on internal delays) of audio signal 318. In another example, display device 302 can obtain the latency from an external electronic device such as electronic device 324. That is, electronic device 324 can determine the latency based on a reception time of audio signal 332 and the transmission time or expected playback time of audio signal 330. Electronic device 324 can send the latency measurement to display device 302.

In step 506, the method 500 includes adjusting, by the electronic device and based on the latency, at least one of a video playback timing and an audio playback timing of an audiovisual media content item. For example, display device 302 can use the latency measurement to adjust (e.g., delay) the playback timing of a visual component of an audiovisual media content item that is to be presented on display 306 and/or an audio component of the audiovisual media content item that is to be played via peripheral audio device 314.

In some examples, the method 500 can include transmitting, by the electronic device, a second signal to a built-in speaker that is integrated with the electronic device. For instance, display device 302 can transmit audio signal 322 to speaker 308. In some cases, to obtain the latency the method 500 can further include receiving the first signal and the second signal via at least one microphone that is coupled to the electronic device and calculating a difference between a first reception time corresponding to the first signal and a second reception time corresponding to the second signal, wherein the latency corresponds to the difference. For instance, display device 302 can receive audio signal 322 and audio signal 320 via microphone 310. Display device 302 can calculate a difference between a reception time corresponding to audio signal 322 and a reception time corresponding to audio signal 320 in order to determine the latency.

In some cases, to obtain the latency the method 500 can further include receiving the latency from an external electronic device, wherein the external electronic device includes at least one microphone that is configured to receive the first signal and the second signal. For instance, display device 302 can receive the latency from electronic device 324, wherein electronic device 324 includes microphone 328 that is configured to receive audio signal 334 and audio signal 332.

In some aspects, to obtain the latency the method 500 can further include receiving the latency from an external electronic device, wherein the external electronic device shares a synchronized clock signal with the electronic device, and wherein the external electronic device includes at least one microphone that is configured to receive the first signal and determine the latency based on the synchronized clock signal. For instance, display device 302 can receive the latency from electronic device 324 and electronic device 324 can share a synchronized clock signal (e.g., interface 336) with display device 302. Electronic device 324 can determine the latency based on the reception time of audio signal 332 and the synchronized clock signal (e.g., used to determine transmission or playback time of audio signal 330).

In some cases, the method 500 can include repeating a transmission of the first signal periodically based on a timer. For example, display device 302 can repeat transmission of audio signal 318 and/or audio signal 322 periodically. In some examples, the method 500 can include detecting a change associated with one or more audio settings and transmitting the first signal in response to detecting the change.

In some configurations, to adjust the video playback timing the method 500 can further include delaying playback of a video component of the audiovisual media content item, wherein the playback of the video component is synchronized with an audio component of the audiovisual media content item that is outputted by the external speaker. For example, display device 302 can delay playback of a video component of an audiovisual media content item such that playback of the video component via display 306 is synchronized with an audio component that is outputted by speaker 316 of peripheral audio device 314.

Figure 6:
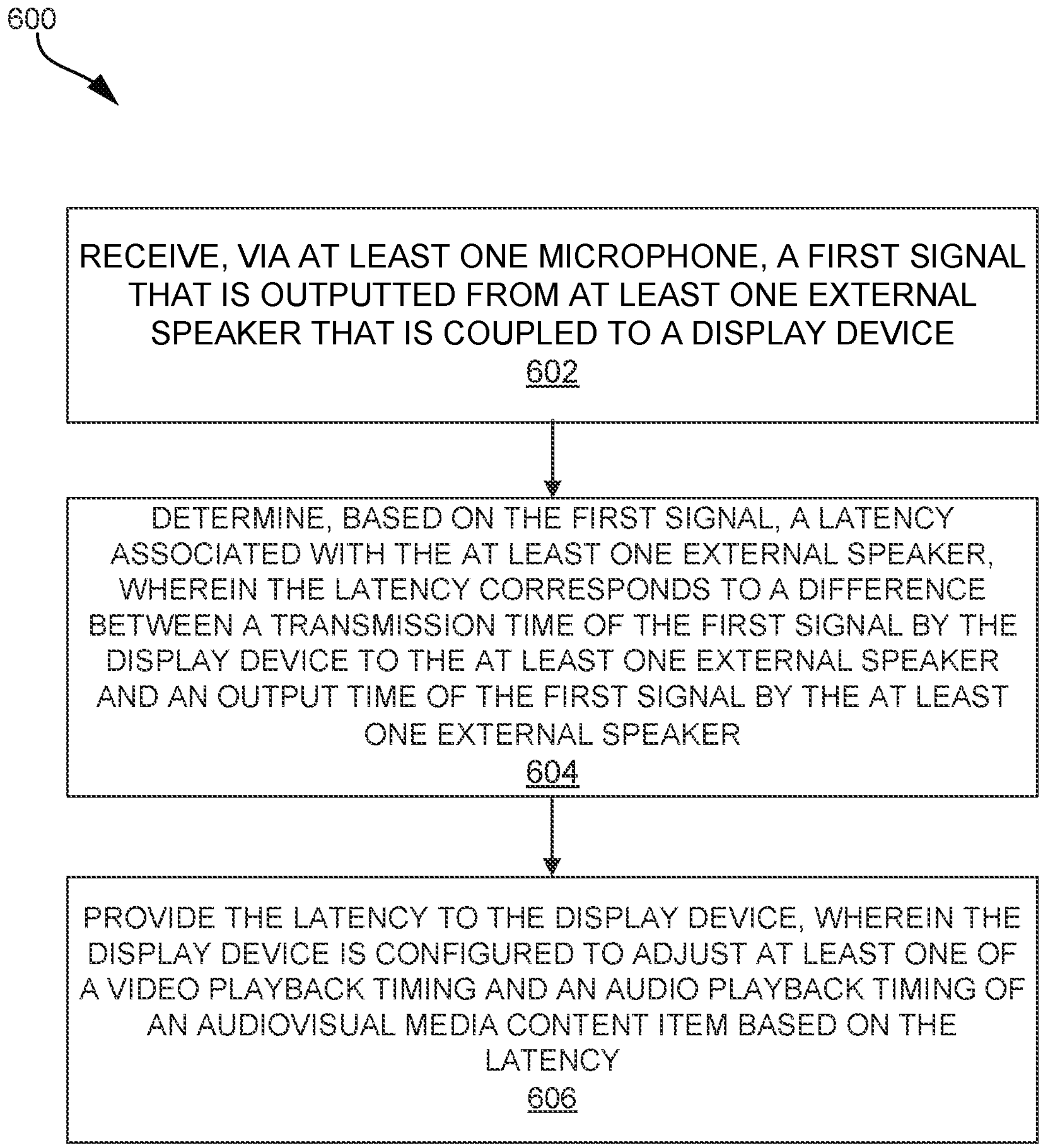
FIG. 6 is a diagram illustrating a flowchart of another example method for synchronizing audiovisual content for playback with peripheral audio, according to some aspects of the present disclosure.

FIG. 6 is a flowchart for a method 600 for synchronizing audiovisual content for playback with a peripheral audio device. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 3A and FIG. 3B. However, method 600 is not limited to those examples.

In step 602, the method 600 includes receiving, via the at least one microphone, a first signal that is outputted from at least one external speaker that is coupled to a display device. For example, display device 302 can receive audio signal 320 that is outputted from speaker 316 of peripheral audio device 314 that is coupled to display device 302. In another example, electronic device 324 can receive audio signal 332 that is outputted from speaker 316 of peripheral audio device 314 that is coupled to display device 302. In some aspects, the first signal can correspond to a spread spectrum signal. In some cases, the first signal can correspond to a portion of an audio signal that is associated with the audiovisual media content item.

In step 604, the method 600 includes determining, based on the first signal, a latency associated with the at least one external speaker, wherein the latency corresponds to a difference between a transmission time of the first signal by the display device to the at least one external speaker and an output time of the first signal by the at least one external speaker. For example, display device 302 can determine a latency associated with peripheral audio device 314 based on a difference between a transmission time of audio signal 318 and an output time of audio signal 320 by peripheral audio device 314. In another example, electronic device 324 can determine a latency associated with peripheral audio device 314 based on a difference between a transmission time of audio signal 330 (e.g., determined based on synchronization with display device 302) and an output time of audio signal 332 by peripheral audio device 314.

In step 606, the method 600 includes provide the latency to the display device, wherein the display device is configured to adjust at least one of a video playback timing and an audio playback timing of an audiovisual media content item based on the latency. For example, display device 302 can provide the latency to one or more modules configured to adjust video or audio playback. In another example, electronic device 324 can send (e.g., provide) the latency to display device 302, which can then be used to adjust video playback timing or audio playback timing for synchronization of the audiovisual elements.

In some examples, the method 600 can include transmitting the first signal to the at least one external speaker. For instance, display device 302 can transmit audio signal 318 to peripheral audio device 314.

In some cases, to determine the latency the method 600 can further include determining the transmission time of the first signal by the display device to the at least one external speaker based on a clock signal that is synchronized with the display device; determining a reception time corresponding to the first signal; and determining a difference between the transmission time and the reception time, wherein the latency corresponds to the difference. For example, electronic device 324 can determine the transmission time of audio signal 330 based on a clock signal that is synchronized with display device 302. In some cases, electronic device 324 can also determine a reception time corresponding to audio signal 330 (e.g., based on reception of audio signal 332). In some aspects, electronic device 324 can determine a difference between the transmission time of audio signal 330 and the reception time of audio signal 332 to determine the latency.

In some instances, to determine the latency the method 600 can further include receiving, via the at least one microphone, a second signal that is outputted from at least one built-in speaker that is associated with the display device, wherein the first signal and the second signal are transmitted simultaneously by the display device; and determining a difference between a first reception time corresponding to the first signal and a second reception time corresponding to the second signal, wherein the latency corresponds to the difference. For example, electronic device 324 can receive audio signal 334 (e.g., outputted from speaker 308 associated with display device 302) via microphone 328. Electronic device 324 can determine a difference between a reception time corresponding to audio signal 334 and audio signal 332 to determine the latency.

In some aspects, the method 600 can include detecting a change associated with one or more audio settings and determining the latency in response to detecting the change. For example, display device 302 can detect a change associated with one or more audio settings (e.g., bass/treble adjustment, surround sound settings, dialogue enhancement, etc.) and display device can determine the latency in response to the change (e.g., to ensure that audiovisual content is synchronized after new settings).

Example Computer System

Figure 7:
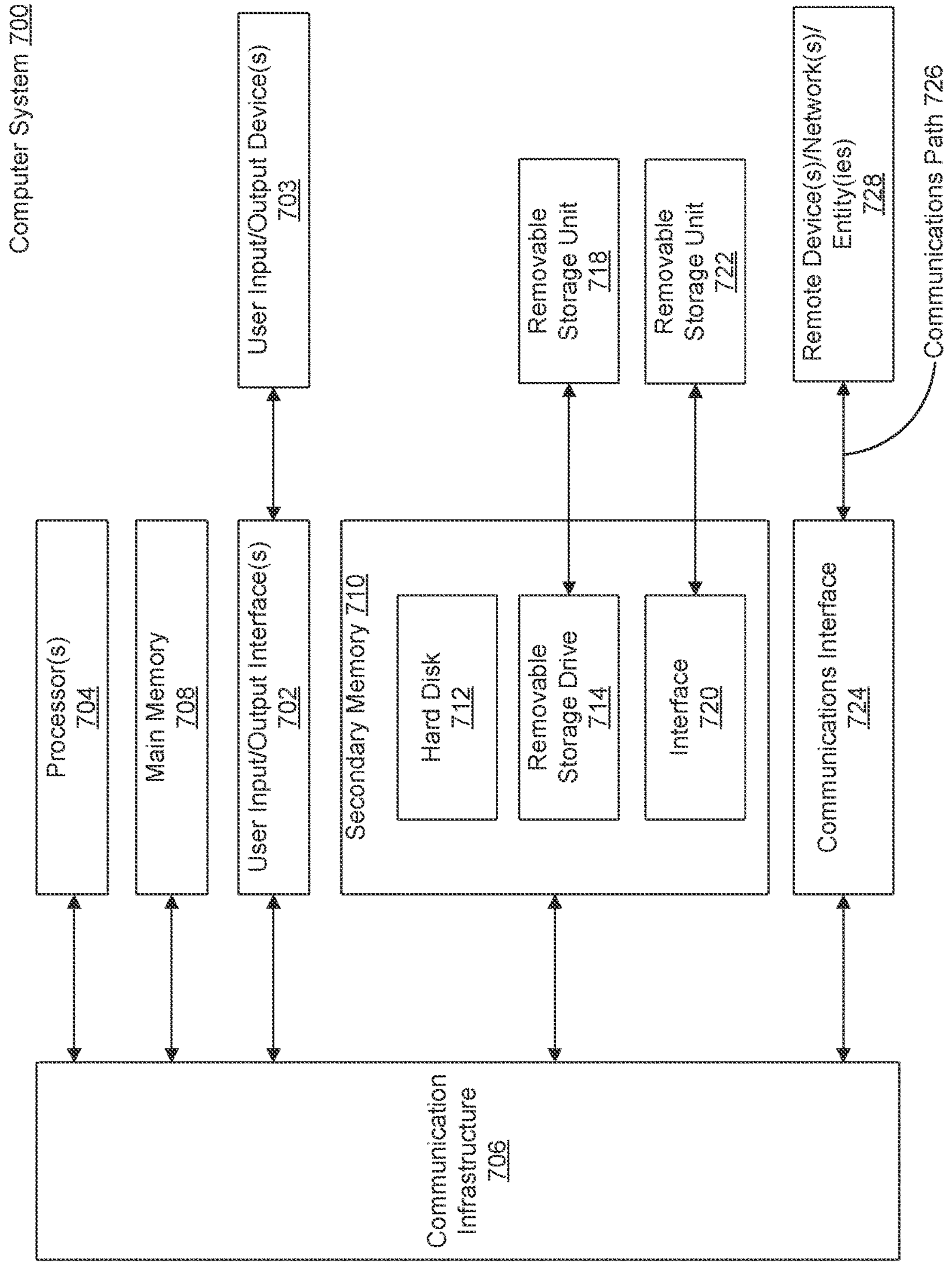
FIG. 7 illustrates an example computer system that can be used for implementing various aspects of the present disclosure.

Various aspects and examples may be implemented, for example, using one or more well-known computer systems, such as computer system 700 shown in FIG. 7. For example, the media device 106 may be implemented using combinations or sub-combinations of computer system 700. Also or alternatively, one or more computer systems 700 may be used, for example, to implement any of the aspects and examples discussed herein, as well as combinations and sub-combinations thereof.

Computer system 700 may include one or more processors (also called central processing units, or CPUs), such as a processor 704. Processor 704 may be connected to a bus or a communication infrastructure 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In some examples, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may include a communication or network interface 724. Communication interface 724 may enable computer system 700 to communicate and interact with any combination of external devices, external networks, external entities, etc. (individually and collectively referenced by reference number 728). For example, communication interface 724 may allow computer system xx00 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A method comprising: receiving, via at least one microphone, a first signal that is outputted from at least one external speaker that is coupled to a display device; determining, based on the first signal, a latency associated with the at least one external speaker, wherein the latency corresponds to a difference between a transmission time of the first signal by the display device to the at least one external speaker and an output time of the first signal by the at least one external speaker; and providing the latency to the display device, wherein the display device is configured to adjust at least one of a video playback timing and an audio playback timing of an audiovisual media content item based on the latency.

Aspect 2. The method of Aspect 1, wherein determining the latency further comprises: determining the transmission time of the first signal by the display device to the at least one external speaker based on a clock signal that is synchronized with the display device; determining a reception time corresponding to the first signal; and determining a difference between the transmission time and the reception time, wherein the latency corresponds to the difference.

Aspect 3. The method of any of Aspects 1 to 2, wherein determining the latency further comprises: receiving, via the at least one microphone, a second signal that is outputted from at least one built-in speaker that is associated with the display device, wherein the first signal and the second signal are transmitted simultaneously by the display device; and determining a difference between a first reception time corresponding to the first signal and a second reception time corresponding to the second signal, wherein the latency corresponds to the difference.

Aspect 4. The method of any of Aspects 1 to 3, wherein the at least one microphone is coupled to at least one of a television, a remote control, an internet-of-things (IoT) device, a mobile phone, and a tablet.

Aspect 5. The method of any of Aspects 1 to 4, wherein the first signal corresponds to a spread spectrum signal.

Aspect 6. The method of any of Aspects 1 to 5, wherein the first signal corresponds to a portion of an audio signal that is associated with the audiovisual media content item.

Aspect 7. The method of any of Aspects 1 to 6, further comprising: transmitting the first signal to the at least one external speaker.

Aspect 8. The method of any of Aspects 1 to 7, further comprising: detecting a change associated with one or more audio settings; and determining the latency in response to detecting the change.

Aspect 9. An apparatus comprising: at least one memory; and at least one processor coupled to the at least one memory, wherein the at least one processor is configured to perform operations in accordance with any one of Aspects 1 to 8.

Aspect 10. An apparatus comprising means for performing operations in accordance with any one of Aspects 1 to 8.

Aspect 11. A non-transitory computer-readable medium comprising instructions that, when executed by an apparatus, cause the apparatus to perform operations in accordance with any one of Aspects 1 to 8.

Aspect 12. A method comprising: transmitting, by an electronic device, a first signal to an external speaker that is coupled to an audio interface associated with the electronic device; obtaining a latency associated with the external speaker, wherein the latency is based on a reception time of the first signal; and adjusting, by the electronic device and based on the latency, at least one of a video playback timing and an audio playback timing of an audiovisual media content item.

Aspect 13. The method of Aspect 12, further comprising: transmitting, by the electronic device, a second signal to a built-in speaker that is integrated with the electronic device.

Aspect 14. The method of Aspect 13, wherein obtaining the latency associated with the external speaker further comprises: receiving the first signal and the second signal via at least one microphone that is coupled to the electronic device; and calculating a difference between a first reception time corresponding to the first signal and a second reception time corresponding to the second signal, wherein the latency corresponds to the difference.

Aspect 15. The method of any of Aspects 13 to 14, wherein obtaining the latency associated with the external speaker further comprises: receiving the latency from an external electronic device, wherein the external electronic device includes at least one microphone that is configured to receive the first signal and the second signal.

Aspect 16. The method of any of Aspects 12 to 15, wherein obtaining the latency associated with the external speaker further comprises: receiving the latency from an external electronic device, wherein the external electronic device shares a synchronized clock signal with the electronic device, and wherein the external electronic device includes at least one microphone that is configured to receive the first signal and determine the latency based on the synchronized clock signal.

Aspect 17. The method of any of Aspects 12 to 16, wherein the first signal corresponds to a spread spectrum signal.

Aspect 18. The method of any of Aspects 12 to 17, further comprising: repeating a transmission of the first signal periodically based on a timer.

Aspect 19. The method of any of Aspects 12 to 18, further comprising: detecting a change associated with one or more audio settings; and transmitting the first signal in response to detecting the change.

Aspect 20. The method of any of Aspects 12 to 19, wherein adjusting the video playback timing further comprises: delaying playback of a video component of the audiovisual media content item, wherein the playback of the video component is synchronized with an audio component of the audiovisual media content item that is outputted by the external speaker.

Aspect 21. An apparatus comprising: at least one memory; and at least one processor coupled to the at least one memory, wherein the at least one processor is configured to perform operations in accordance with any one of Aspects 12 to 20.

Aspect 22. An apparatus comprising means for performing operations in accordance with any one of Aspects 12 to 20.

Aspect 23. A non-transitory computer-readable medium comprising instructions that, when executed by an apparatus, cause the apparatus to perform operations in accordance with any one of Aspects 12 to 20.

What is claimed is:

1. A computer-implemented method comprising:

transmitting, by an electronic device, a first audio signal to an external speaker that is coupled to an audio interface associated with the electronic device;

transmitting, by the electronic device, a second audio signal to a built-in speaker that is integrated with the electronic device;

receiving the first audio signal and the second audio signal via at least one microphone that is coupled to the electronic device;

determining a latency associated with the external speaker based on a difference between a first reception time corresponding to the first audio signal and a second reception time corresponding to the second audio signal; and adjusting, by the electronic device and based on the latency, at least one of a video playback timing and an audio playback timing of an audiovisual media content item.

2. The computer-implemented method of claim 1, wherein the first audio signal corresponds to a spread spectrum signal.

3. The computer-implemented method of claim 1, further comprising:

repeating a transmission of the first audio signal periodically based on a timer.

4. The computer-implemented method of claim 1, further comprising:

detecting a change associated with one or more audio settings; and transmitting the first audio signal in response to detecting the change.

5. The computer-implemented method of claim 1, wherein adjusting the video playback timing further comprises:

delaying playback of a video component of the audiovisual media content item, wherein the playback of the video component is synchronized with an audio component of the audiovisual media content item that is outputted by the external speaker.

6. The computer-implemented method of claim 1, wherein the first audio signal and the second audio signal are transmitted simultaneously.

7. The computer-implemented method of claim 1, wherein at least one of the first audio signal and the second audio signal comprises a subaudible signal.

8. The computer-implemented method of claim 1, wherein adjusting the audio playback timing further comprises:

delaying transmission of an audio component of the audiovisual media content item via the audio interface, wherein the audio component is synchronized with a video component of the audiovisual media content item that is presented on a display of the electronic device.

9. The computer-implemented method of claim 1, wherein the first audio signal corresponds to a portion of an audio signal associated with the audiovisual media content item.

10. The computer-implemented method of claim 1, further comprising:

transmitting the latency and device identification data associated with the external speaker to a remote server, wherein the remote server is configured to adjust audiovisual playback settings of one or more other electronic devices based on the latency and the device identification data.

11. A non-transitory computer-readable medium having instructions stored thereon that, when executed by at least one computing device, cause the at least one computing device to perform operations comprising:

transmit, by an electronic device, a first audio signal to an external speaker that is coupled to an audio interface associated with the electronic device;

transmit, by the electronic device, a second audio signal to a built-in speaker that is integrated with the electronic device;

receive the first audio signal and the second audio signal via at least one microphone that is coupled to the electronic device;

obtain a latency based on a difference between a first reception time corresponding to the first audio signal and a second reception time corresponding to the second audio signal, wherein the latency corresponds to the difference; and adjust at least one of a video playback timing and an audio playback timing of an audiovisual media content item based on the latency.

12. The non-transitory computer-readable medium of claim 11, wherein the first audio signal and the second audio signal are transmitted simultaneously.

13. The non-transitory computer-readable medium of claim 11, wherein at least one of the first audio signal and the second audio signal comprises a subaudible signal.

14. The non-transitory computer-readable medium of claim 11, having further instructions stored thereon that cause the at least one computing device to perform operations comprising: delay playback of a video component of the audiovisual media content item, wherein the playback of the video component is synchronized with an audio component of the audiovisual media content item that is outputted by the external speaker.

15. The non-transitory computer-readable medium of claim 11, having further instructions stored thereon that cause the at least one computing device to perform operations comprising: transmit the latency and device identification data associated with the external speaker to a remote server, wherein the remote server is configured to adjust audiovisual playback settings of one or more other electronic devices based on the latency and the device identification data.

16. The non-transitory computer-readable medium of claim 11, wherein the first audio signal corresponds to a spread spectrum signal.

* * * * *